Dec. 25, 1956 R. F. SCHALK 2,775,731
CAPACITOR-CHARGING SYSTEM
Filed Oct. 14, 1954

INVENTOR
R. F. SCHALK
BY C. B. Hamilton
ATTORNEY

United States Patent Office 2,775,731
Patented Dec. 25, 1956

2,775,731

CAPACITOR-CHARGING SYSTEM

Robert F. Schalk, Chicago, Ill., assignor to Western Electric Company, Incorporated, New York, N. Y., a corporation of New York Application October 14, 1954, Serial No. 462,261

7 Claims. (Cl. 320—1)

This invention relates to capacitor-charging systems, and more particularly to systems for charging capacitors of welding circuits.

In the use of welding circuits including capacitors, it is sometimes necessary to charge the capacitors to very precise voltages with charging means, and it is also desirable to do so as rapidly as possible without substantially overloading the charging means.

An object of the invention is to provide new and improved systems for charging capacitors.

Another object of the invention is to provide new and improved capacitor-charging welding systems.

A further object of the invention is to provide apparatus for rapidly charging welding capacitors with regulated power supplies without substantially overloading the power supplies during the charging periods.

An apparatus illustrating certain features of the invention may include a capacitance load circuit, a regulated power supply and variable impedance means connecting the power supply to the load circuit. Means also are provided for adjusting the impedance means downwardly as the load circuit approaches a charged condition. This adjusting means may include two pairs of rectifying tubes and synchronous timing means for actuating the pairs of tubes in overlapping relationship so that the impedance of the circuit may be decreased as the charge on the load circuit increases.

Figure 2:
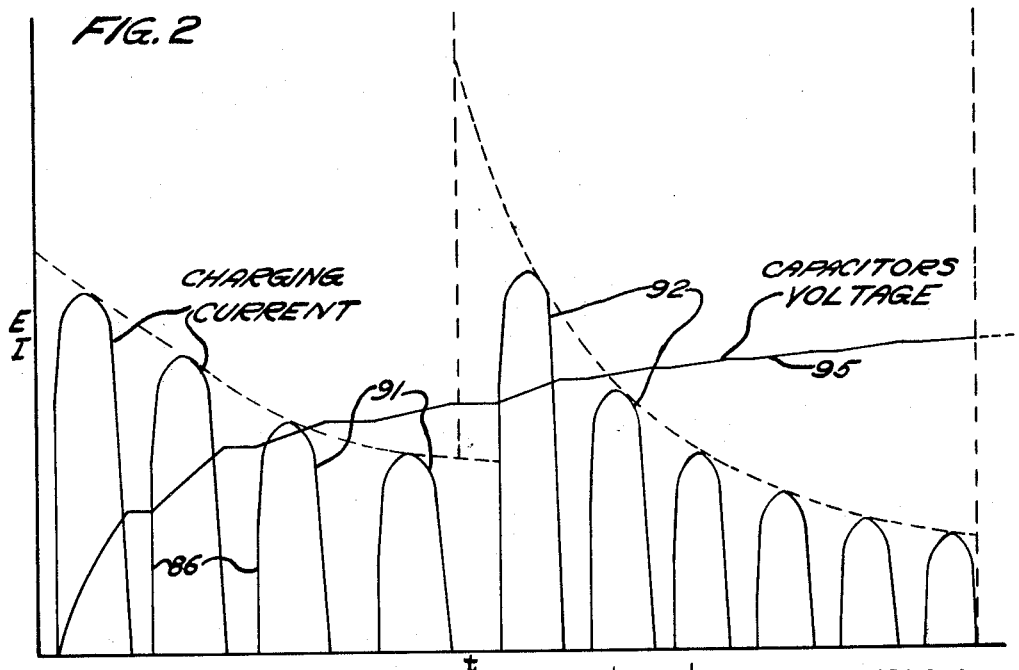
Figure 1:
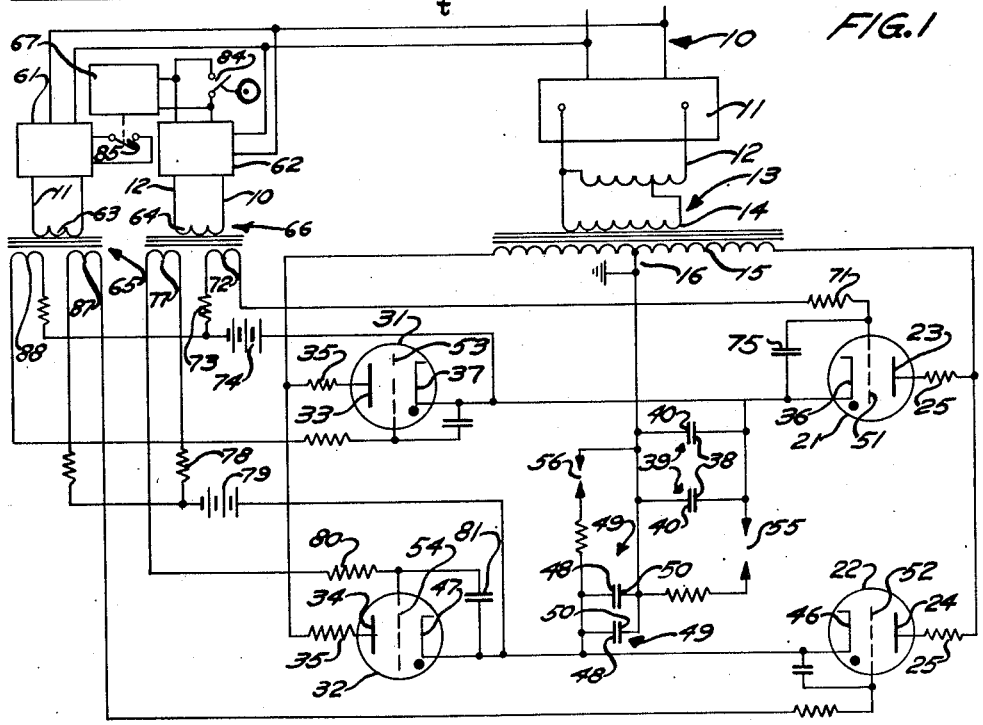

A complete understanding of the invention may be obtained from the following detailed description of a capacitor-charging system forming a specific embodiment of the invention, when read in conjunction with the appended drawings, in which Fig. 1 is a diagrammatic view of a system forming one embodiment of the invention, and Fig. 2 is a graphical view illustrating certain characteristics of the system shown in Fig. 1.

Referring now in detail to the drawings, there is shown in Fig. 1 a circuit which includes an A. C. power line 10 supplying a constant voltage transformer 11, which supplies power to a "Variac" 12. The "Variac" supplies a predetermined voltage output to a step-up transformer 13 having a primary winding 14 and a secondary winding 15 connected by a conductor 16 to ground at center thereof. Gas-filled tubes 21 and 22 have anodes 23 and 24 connected by resistors 25 to one end of the secondary winding 15, and gas-filled tubes 31 and 32 have anodes 33 and 34 connected by resistors 35 to the other end of the secondary winding 15. Cathodes 36 and 37 of the tubes 21 and 31 are connected to plates 38 of capacitors 39 having plates 40 grounded. Similarly, cathodes 46 and 47 of the tubes 22 and 32, respectively, are connected to plates 48 of capacitors 49 having plates 50 connected to ground. The capacitors 39 and 49 form portions of welding circuits including electrodes 55 and 56, and are for the purpose of supplying welding energy to the electrodes. The tubes 21, 22, 32 and 33 are provided with triggering grids 51, 52, 53 and 54, respectively.

Adjustable synchronous timers 61 and 62 of a well known type commonly used with spot welders supply alternating current signals continuously to primary windings 63 and 64 of transformers 65 and 66. A third synchronous timer 67 is provided with adjustable normally open contacts 85 to the timer 61. The timer 62 may be preset so that until the timer 62 is started by closing of a cam-actuated switch 84 the transformer 66 supplied with power through the timer 62 applies A. C. voltages to the grids 51 and 54 180° out of phase with the voltages applied to the plates 23 and 34, respectively, by the transformer 13. Similarly, the timer 61, until triggered by closing of the contacts 85, induces phase voltage outputs of the transformer 65 180° out of phase with the voltages on the plates 24 and 33. The timer 67 is started by the closing of the switch 84, and a predetermined number of cycles later, to which the timer 67 is adjusted, the timer 67 closes the contacts 85 thereof to immediately advance the phases of the voltage outputs of the transformer 65.

The timers are preset so that after the switch 84 is closed, the timer 61 advances the phases of the output voltages of the transformer 66 a preselected amount equal to or less than 180° so that the tubes 21 and 32 are fired. The preselected extent that this phase shift is under 180° causes a preselected lag in the phase of the grid voltages relative to the plate voltages so that each of the tubes 21 and 32 is conductive only for a predetermined portion of each half cycle in which its plate or anode is positive. The timer 62 can be preset to cut off any desired portion of the half-waves to the tubes 21 and 32 so that the quantity of electricity fed to the capacitors 39 and 49 by these tubes is precisely regulated and has a very fine adjustment.

A resistor 71 connects the grid 51 to an end of a winding 72 of the transformer 66 having the opposite end thereof connected by resistors 73 and a grid-biasing battery 74 to the cathodes 36 and 37. A capacitor 75 filters undesired signals to the grid 51. One end of a secondary winding 77 of the transformer 66 is connected by a resistor 78 and a battery 79 to the cathodes 46 and 47, and the other end thereof is connected by a resistor 80 to the grid 54 of the tube 32, and a filtering capacitor 81 connects the resistor 80 to the grid 54 of the tube 32.

The timers 61, 62 and 67 are supplied with power from the power line 10, in synchronism with the transformer 13. The grids 51 and 54 are made sufficiently positive on preselected portions of alternate half cycles to make the tubes 21 and 32 conductive to charge the capacitors 39 and 49. The tubes 22 and 31 are similarly connected to secondary windings 87 and 88 of the transformers 65, and when the timer 61 has been started by the timer 67, it advances the phases of the voltage outputs of the transformer 65 to bring the voltages on the grids 52 and 53 from phases 180° behind the phases of the plates or anodes 24 and 34, respectively, to a lesser predetermined extent behind the phases of these plates so that each of the tubes 22 and 31 is fired during a precisely controlled portion of each half cycle that the plate thereof is positive. The tubes 22 and 31 are fully conductive after being fired and act as a full wave rectifier for the transformer 13 except for the nonconductive periods due to the lag in phase of the transformer 65. Thus, the portion or percentage of the full output of the transformer 13 utilized to charge the condensers 39 and 40 is dependent on the phase relationship between the transformers 65 and 66 with the transformer 13, and also upon whether only the tubes 21 and 32 are being made conductive with the transformer 13 or whether all four tubes 21, 22, 31 and 32 are brought to overlapping phase relationship with the transformer 13 thereby lessening the impedance of the circuits to the capacitors 39 and 49, and supply alternating current of the same frequency as that of the power line to the windings 63 and 64.

The timers 62 and 67 are started by closing of the cam-controlled switch 84 controlled by a welding machine including the electrodes 55 and 56, and, after a delay of a preset number of cycles, the timer 67 closes relay contacts 85 to advance the phase of the timer 61 to bring the phases of the transformers to triggering relationship to the tubes 22 and 31. After a further predetermined number of cycles controlled by the settings of the timers 61 and 62, the timer 62 stops itself to shift the phase outputs of the transformer 66 to 180° opposite to that of the voltages on the plates 23 and 34, and the timer 61 shifts the phase outputs of the transformer 65 to 180° out of phase with the voltage phases of the plates 24 and 33.

The timers 61, 62 and 67 are set to initially provide alternation of the voltage output of the transformers 65 and 66 180° out of phase with the alternations of voltage on the plates of the tubes connected to the respective windings 72, 77, 87 and 88. Then, the tubes 21 and 32 are made conductive during only a preselected portion of each half cycle that the plate 23 or the plate 34 is positive. Thus, each of the tubes 21 and 32 charge the capacitors only a precisely controlled portion of each half cycle that the plate thereof is positive dependent on the phase setting of the timer 62, the first portion of each half cycle of the transformer being that which is cut out as illustrated by vertical portion 86 of rectified current waves 91 (Fig. 2) representing the current delivered to the capacitors 39 and 49 from the tubes 21 and 32. The timer 61 also is set independently of the setting of the timer 62 to cut off the initial portions of the half cycles of positive voltage to the plates 24 and 33 of the tubes 22 and 31, respectively, the timer 61 preferably being set so that the triggering phase of the transformer 65 is identical with that of the transformer 66 after the timer 61 is started by the timer 67. The combined current pulses when all of the tubes 21, 22, 31 and 32 are conductive is illustrated by rectified current waves 92.

*Operation*

The welding machine closes the switch 84, and the phase of the timers 62 and 67, and the timer 62 shifts the voltage outputs of the transformer 66 slightly behind in phase to those of the transformer 13. The tubes 21 and 32 are triggered on portions of alternate half cycles to charge the capacitors 39 and 49 to voltages shown by a curve 95, the current dropping as the charges on the capacitors increase. After the capacitors are partially charged, the timer 67 actuates the timer 61, which then makes the tubes 22 and 31 conductive simultaneously with the tubes 32 and 21, respectively, and the current to the capacitors rises due to the lessened impedance caused by the added path through the resistors 25 and 35 and tubes 21 and 32 created by the tubes 22 and 31. Hence, the charging rate rises as indicated by the upper portion of the capacitor voltage curve 95. After a predetermined number of current cycles, the timers 61 and 62 time out which leaves the capacitors 39 and 49 at a precisely charged voltage. Then the welding machine opens the switch 84, and moves the electrodes 55 and the electrodes 56 together with parts to be welded to weld the parts and discharge the capacitors 39 and 49 completely. The parts are removed from the electrodes, the switch 84 is reclosed to recharge the capacitor and new parts are placed in the electrodes for welding operations thereon.

The above-described apparatus precisely charges the capacitors 39 and 49 with a predetermined number of cycles of current, which may be varied by manually adjusting the timers 61 and 62 for rough adjustment. The timers also may be adjusted to control the triggering phase lag for fine adjustment of the charges. The apparatus effects the charging without overloading the regulated transformer 11 since the initial charging surge is limited by the tubes 21 and 32 only being conductive.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A welding circuit, which comprises a power supply having a predetermined voltage output, a capacitive load circuit, variable impedance means connected between the power supply and the load circuit, and means automatically operable for varying the impedance means downwardly as the load circuit approaches a charged condition.

2. A welding circuit, which comprises a regulated power supply having a predetermined voltage output, a capacitive load circuit, a pair of trigger tubes connected in parallel with one another between the power supply and the load circuit, and timing means for sequentially triggering the tubes to lower the impedance to the load circuit to keep the load on the power supply high during charging of the load circuit.

3. A welding circuit, which comprises a regulated A. C. power supply, a welding circuit, a capacitor for energizing the welding circuit, a pair of grid-controlled rectifying gas-filled tubes connected in parallel between the power supply and one plate of the capacitor, and synchronous timing means for making only one of the tubes conductive for a predetermined period of time and both the tubes conductive immediately thereafter for a predetermined period of time.

4. A welding circuit, which comprises power supply means, a chargeable capacitive load circuit, means having a predetermined impedance operative to connect the power supply means to the load circuit during the initial surge of current to the load circuit, and automatically operable means for reducing the impedance between the power supply means and the load circuit after the load circuit has been partially charged.

5. A welding circuit, which comprises a regulated A. C. power supply, a transformer energizable by the power supply and having a center-tapped secondary winding, a first welding circuit, a first capacitor for energizing the first welding circuit, a second welding circuit, a second capacitor for energizing the second welding circuit, a pair of grid-controlled rectifying gas-filled tubes connected in parallel between one end of the secondary winding and one plate of the first capacitor, means connecting the other plate of the first capacitor to the center of the winding, a second pair of grid-controlled gas-filled tubes connected in parallel with one another between the other end of the winding and a plate of the second capacitor, means connecting the other plate of the second capacitor to the center of the winding, and synchronous timing means for making only one tube of each pair of tubes conductive over a predetermined period of time and the both tubes of each pair of tubes conductive after the capacitor has been partially charged.

6. A welding circuit, which comprises a regulated A. C. power supply, a transformer energizable by the power supply and having a center-tapped secondary winding, a welding circuit, a capacitor for energizing the first weldfing circuit, a second welding circuit, a second capacitor for energizing the second welding circuit, a pair of grid-controlled rectifying gas-filled tubes connected in parallel between one end of the secondary winding and one plate of the first capacitor, means connecting the other plate of the first capacitor to the center of the winding, a second pair of grid-controlled gas-filled tubes connected in parallel with one another between the other end of the winding and a plate of the second capacitor, means connecting the other plate of the second capacitor to the center of the winding, a synchronous timer energized by the power supply for making only one tube of each pair of tubes conductive for a predetermined number of cycles of the power supply, and a second synchronous timer actuated by the first timer for making the other tube of each pair of tubes conductive during a portion of said predetermined number of cycles.

7. A welding circuit, which comprises a regulated A. C. power supply, a transformer energizable by the power supply and having a center-tapped secondary winding, a welding circuit, a capacitor for energizing the first welding circuit, a second welding circuit, a second capacitor for energizing the second welding circuit, a pair of grid-controlled rectifying gas-filled tubes connected in parallel between one end of the secondary winding and one plate of the first capacitor, means connecting the other plate of the first capacitor to the center of the winding, a second pair of grid-controlled gas-filled tubes connected in parallel with one another between the other end of the winding and a plate of the second capacitor, means connecting the other plate of the second capacitor to the center of the winding, and phase-shifting timing means for making only one tube of each pair of tubes conductive over a predetermined period of time and the both tubes conductive after the capacitor has been partially charged, said phase-shifting timing means being energized by the power supply and making each tube conductive for only a portion of each half cycle that the plate thereof is positive.

References Cited in the file of this patent
UNITED STATES PATENTS

| | | |
|---|---|---|
| 2,441,822 | Klemperer | May 18, 1948 |
| 2,483,691 | Dawson | Oct. 4, 1949 |